United States Patent [19]
Burger et al.

[11] Patent Number: 5,349,537
[45] Date of Patent: Sep. 20, 1994

[54] HYDRAULICALLY DAMPED RUBBER BEARING THAT SUPPORTS A MECHANICAL SUBASSEMBLY

[75] Inventors: Stefan Burger, Weinheim; Georg Feurer, Mörlenbach; Tillman Freudenberg, Weinheim; Ulrich Freudenberg, Hirschberg; Uwe Weltin, Rimbach, all of Fed. Rep. of Germany

[73] Assignee: Firma Carl Freundenberg, Weinheim/Bergstrasse, Fed. Rep. of Germany

[21] Appl. No.: 831,725

[22] Filed: Feb. 5, 1992

[30] Foreign Application Priority Data

Feb. 12, 1991 [DE] Fed. Rep. of Germany ....... 4104168

[51] Int. Cl.$^5$ .................................................. F16F 9/53
[52] U.S. Cl. ...................................... 364/508; 280/707; 267/140.15
[58] Field of Search ............................ 364/508, 424.05; 73/593, 665; 180/312; 280/707, 709; 267/140.11, 140.15; 248/550

[56] References Cited

U.S. PATENT DOCUMENTS

| | | | |
|---|---|---|---|
| 4,638,983 | 1/1987 | Idigkeit et al. | 267/140.1 |
| 4,802,648 | 2/1989 | Decker et al. | 248/550 |
| 4,869,474 | 9/1989 | Best et al. | 267/136 |
| 5,060,919 | 10/1991 | Takano et al. | 267/140.1 |
| 5,133,527 | 7/1992 | Chen et al. | 248/550 |
| 5,176,368 | 1/1993 | Shtarkman | 267/140.14 |
| 5,219,037 | 6/1993 | Smith et al. | 180/312 |

*Primary Examiner*—Thomas G. Black
*Assistant Examiner*—Michael Zanelli
*Attorney, Agent, or Firm*—Sprung Horn Kramer & Woods

[57] ABSTRACT

A hydraulically damped rubber bearing, that supports a vibrating mechanical subassembly on a substructure, has an actuator with an electromagnetic drive mechanism associated with a fluid filled chamber. The drive mechanism is responsive to performance characteristic controls which are electrically connected to at least one signal emitter in the subassembly and have a final stage in the front of a power amplifier.

4 Claims, 1 Drawing Sheet

HYDRAULICALLY DAMPED RUBBER BEARING THAT SUPPORTS A MECHANICAL SUBASSEMBLY

BACKGROUND OF THE INVENTION

The invention concerns a hydraulically damped rubber bearing that supports a vibrating mechanical subassembly on a substructure, whereby an actuator with an electromagnetic drive mechanism is associated with a fluid filled chamber and the drive mechanism has performance characteristic controls that are connected to a signal emitter in the subassembly and have a final stage in the form of a power amplifier.

A rubber bearing of this type is known from German Patent No. 3,433,255 (U.S. Pat. No. 4,638,483 issued Jan. 27, 1987). The actuator, subject to the controls, optimally compensates all the unwanted vibrations occasioned by the subassembly during previously determined operating states. For this purpose the actuator is controlled in accordance with a graph of empirically determined optimal responses plotted as functions of parameters obtained from the subassembly and characterizing particular operating states. One such parameter for example is revolutions per minute. In the automotive field this approach allows the optimal isolation of vibrations occasioned at a particular number of revolutions by the particular gear engagement, by the throttle setting, and by the vacuum in the intake manifold for example. The spectrum of unwanted vibrations that can and do occur in actual driving situations is, however, only inadequately dealt with by this method. Furthermore, the use of control data, which are highly complicated to obtain and plot, makes sense only as long as no secondary alterations occur in the system as such—a change in the weight of the mass being cushioned for example and/or an age-dictated change in the resilience of the rubber components of the bearing cannot be tolerated.

A hydraulically cushioned rubber bearing is known from German Patent No. 3,918,753. The actuator-drive mechanism is designed to suppress acoustically active vibrations with particular effectiveness when it is operated as intended. The specific control technology required is not mentioned.

SUMMARY OF THE INVENTION

The principal object of the present invention is to further develop a rubber bearing of the aforesaid type to the extent that it will, in all conceivable driving situations, ensure definitely improved isolation of the unwanted acoustic vibrations occasioned by the subassembly in relation to the substructure that supports the bearing.

This object, as well as other objects that will become apparent from the discussion that follows, is achieved in accordance with the present invention by providing a signal generator downstream of the first signal emitter that generates two harmonic, mutually phase-shifted first signals of a frequency agreeing with each other and with the vibrations of the subassembly and a second signal that reproduces the frequency in a characteristic way, in that this second signal is forwarded to characteristic curve generators, of which the functional coherence between incoming and outgoing signal is randomly established, in that the output signals from these characteristic curve generators are multiplied by the first signals from the sine-wave generator and the accordingly obtained third signals are added pair-wise, in that the accordingly obtained signals are each multiplied by a fourth signal from a sensor that reproduces the relative motions of the substructure in a characteristic way, in that the two accordingly obtained fifth signals are each forwarded to a transfer component that is to be randomly established and that exhibits low pass behavior above a randomly establishable frequency, in that the accordingly obtained sixth signals are each multiplied by the signals from the signal generator, and in that the accordingly obtained seventh signals are added to produce an eighth signal that is amplified in the power amplifier and employed to activate the drive mechanism.

It is accordingly possible with the rubber bearing in accordance with the invention to initiate control of the electromechanical actuator-drive mechanism by means similar to those in the embodiment initially described, which in the ideal case allows optimal isolation of unwanted acoustical vibrations. Residual vibrations occurring in the substructure that supports the rubber bearing are accordingly detected and utilized to continuously modify the signal that initiates control of the actuator, ensuring optimal vibration isolation even when less than optimal conditions, normal operating conditions, that is, are present. Changes in the resiliency properties of the rubber-resilient spring component in the rubber bearing in consequence of changes in ambient temperature and/or aging processes can also be taken directly into account.

It has been demonstrated to be of particular advantage for an analog-to-digital converter to be downstream of at least one of the sensors and a digital-to-analog converter to be upstream of the power amplifier. It accordingly becomes possible to initiate control of the actuator to a very high degree by means of digital control components, whereby the introduction of freely programmable components makes particular sense.

In principle, the sine-wave generator, characteristic curve generators, adding circuits, branches, multipliers, transmitting members, and power amplifiers can be at least to some extent be realized with digital components. Which functions are to be carried out analog or digital form is immaterial.

It is of advantage in many applications for the characteristic curve generators to be digital, whereby even complicated functional relationships between the second signals from the signal generator, which characterize the frequency that the subassembly is vibrating at, and the signals leaving the characteristic curve generator can be represented. It becomes possible to establish such relationships section by section as constant for each specific frequency range, for example, and to store them in the form of a table.

It is not only reasons of economy but also flexibility in adapting the controls to various types of engine mounts and operating conditions that recommends such a digital realization. The basic principles of digital signal processing, especially Shannon's theorem must be taken into account.

In certain situations it will also be necessary to introduce analog low pass filters upstream of the analog-to-digital converters to avoid aliasing effects and an analog low pass filter downstream of the digital-to-analog converter to even out the stepped curvature of the emitted signal and to forward the accordingly smooth signal to the power amplifier. Such additional filters must then if necessary be taken into account in the functions carried out by the characteristic curve generators.

Provisions are made for the phase shift between the two first signals generated by the signal generator to be determined in accordance with the second signal generated by the signal generator and characterizing the frequency that the subassembly is vibrating at. This can be attained for example with dead-time members, analog or digital filters, shift registers, etc.

The preferred embodiments of the invention will now be described with reference to the accompanying drawing.

DESCRIPTION OF THE PREFERRED EMBODIMENTS

Figure 1:
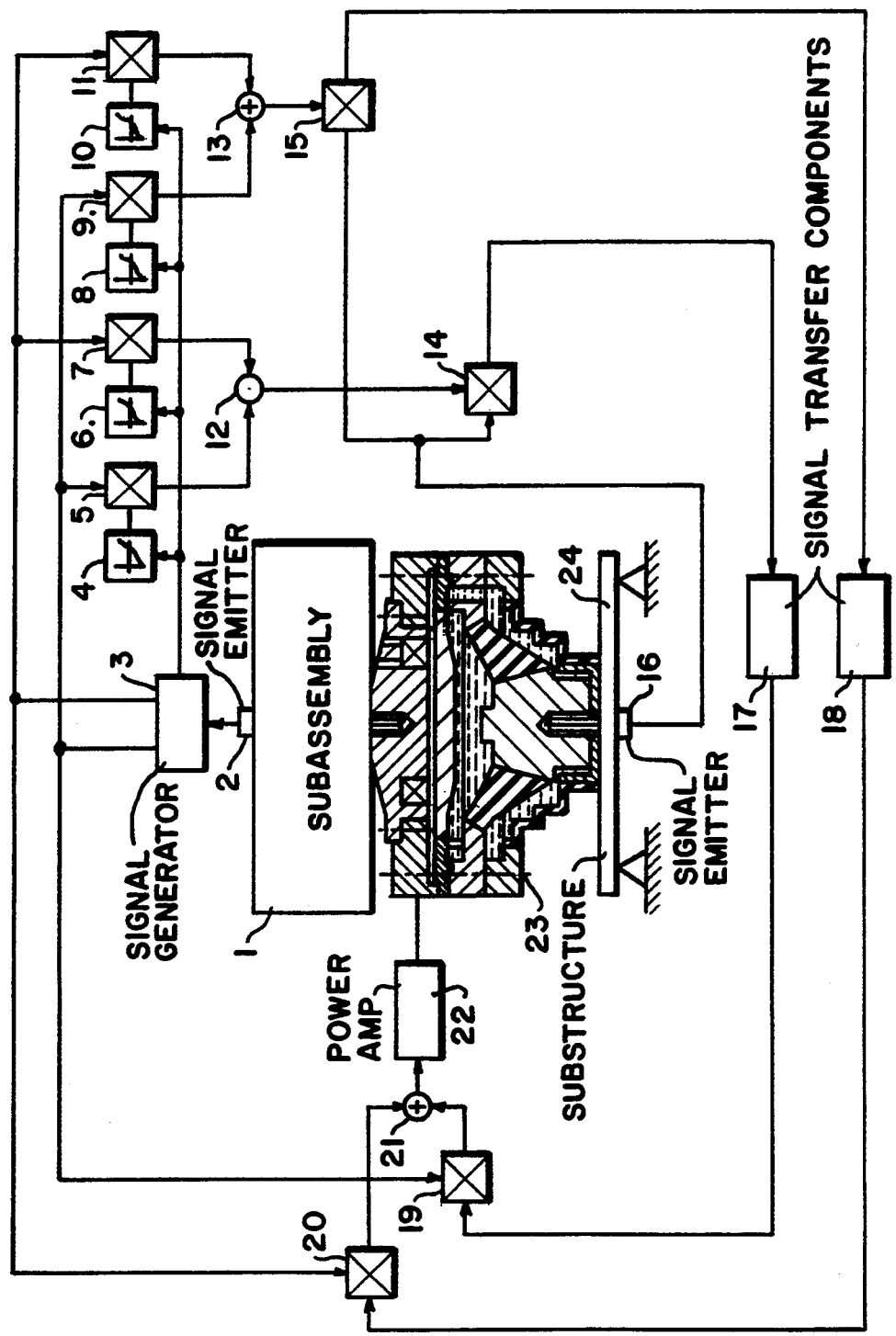
FIG. 1 is a block diagram of a rubber bearing arranged to support a mechanical subassembly on a substructure, and an associated control circuit according to the invention.

It is especially significant, in relation to the use hereintofore described, for the rubber bearing to rest on a substructure, which can comprise part of an automobile body for example, that exhibits a certain level of compliance and damping to vibration.

The automobile engine, mounted on the rubber bearing, may be a conventional reciprocating piston engine, wherein the back-and-forth motions of the pistons are converted into rotational motion by means of a crankshaft. Under normal conditions the conversion results in vibrations that can make themselves readily apparent inside the passenger compartment of the vehicle. It is accordingly desirable to be able to isolate such vibrations from the body of the vehicle, which can be done with the proposed rubber bearing in a way that has heretofore been impossible and even during rapid changes in engine RPM.

The rubber bearing itself can, but need not, be of type design disclosed in German Patent No. 3,918,753. The actuator has an electromagnetic drive mechanism that makes it possible to compensate for any changes in pressure that occur in the fluid-filled chamber when vibrations are introduced in the top of the bearing and accordingly prevent them from being transmitted to the substructure. This is accomplished with the circuitry that will now be described.

The rubber bearing in accordance with the invention is controlled by means of a method or "algorithm" distinguished by very few computing operations. Less memory is needed when the rubber bearing is controlled in this way. All that needs to be stored are the functional relations determined by preliminary testing and realized in the controlling method by means of the characteristic curve generators. Analog to digital converters are provided downstream of the vibration sensors and a digital to analog converter is provided upstream of the power amplifier.

The method employed for controlling the rubber bearing is appropriate for wide frequency ranges. It is distinguished from the aspect of controls technology by an especially high level of robustness. It is accordingly ensured that even changes in the dynamic behavior of the power amplifier, rubber bearing, substructure, and sensors can be tolerated over wide ranges. Furthermore, the method employed for controlling the rubber bearing is also appropriate for rapid changes in the frequencies of the vibrations being isolated and especially for those occasioned by changes in the vibrating frequencies of a subassembly. The rubber bearing can accordingly also be employed effectively to support the internal combustion engine in an automobile.

Structure and Function of the Rubber Bearing

The rubber bearing arrangement according to the invention isolates harmonic vibrations like those emitted from an unbalance-excited subassembly. The frequency of harmonic unbalance vibrations is in constant ratio to the number of revolutions per minute of a rotating component and can accordingly be precisely defined. The objective is to generate a signal with a frequency that equals the frequency of the harmonic unbalance excitation.

This signal must be dimensioned and phased such that, when it is forwarded to the actuator of the aforesaid rubber bearing by way of a power amplifier, the desired vibration isolation can be attained.

One interesting field of application is control of the resilient mounts for reciprocating piston engines in motor vehicles. In in-line four cylinder engines, for example, vibrations occur at frequencies twice that of the engine speed. The proposed rubber bearing is outstandingly appropriate for isolating such vibrations. Should they reach the body of the vehicle, however, they would occasion a loud humming in the passenger compartment. Thus, the rubber bearing in accordance with the invention will definitely increase passenger comfort.

As shown in FIG. 1, a signal emitter 2 forwards a periodic timing signal with a period at a fixed ratio to the period of the vibration that is to be isolated. A signal emitter of this type can process, for example, the motion of the engine subassembly 1, filtering out when necessary the unwanted components of the signal. Another possibility is a sensor that emits a constant number of pulses per revolution of a rotating component. One example is what is called an upper dead-center sensor, which emits a signal when a specific piston in a reciprocating engine is at its upper dead center. The result is precisely one pulse per rotation of the crankshaft.

A signal generator 3 receives the timing signal from signal emitter 2 and generates from it two harmonic oscillations of different phase. The difference between the two phases can also be controlled in accordance with frequency. The frequency of the two harmonic oscillations is identical with that of the vibration to be isolated.

The signals leaving the sine wave generator will be designated $$u_1(t) = \sin(wt)$$

and $$u_2(t) = \sin(wt + \phi[w])$$

hereinafter, with w representing the angular frequency if the vibration to be isolated.

Two special cases are conceivable. In the first, $$\phi(w) = 90° \text{ (a constant)},$$

in which case $$u_1(t) = \sin(wt)$$

and $$u_2(t)=\sin(wt+90°)=\cos(wt).$$

In the second, $$u_1(t)=\sin(wt)$$

and $$u_2(t)=\sin(wt-wT)=\sin(w[t-T])=u_1(t-T),$$

whereby the frequency-dependent phase angle is constructed from $$\phi(W)=-(wT),$$

wherein T is an appropriate dead time.

Signal $u_2(t)$ is obtained by delaying $u_1(t)$ by T. This can be a good idea in a digital system for example. When T is a integral multiple of the scanning time, $u_1$ can be chronologically displaced very simply with a shift register. The possibility can be exploited in particular when the range of operational RPM is limited.

In implementing the rubber bearing controls it will be necessary for $\phi(w)$ to be neither an integral multiple of 180° nor zero. The signal generator also generates a signal characterizing the frequency of the unbalance-excited subassembly. Such a signal can for example be directly proportional to the frequency or period of the corresponding vibration.

The requisite associated components of such a signal generator can be phase locked loop circuits, tracking filters, and digital oscillators.

The signal $u_1(t)$ leaving signal generator 3 is multiplied in a multiplier 19 by a signal $r_1(t)$ leaving a transfer component 17, resulting in the product $$v_1(t)=r_1(t)\cdot u_1(t)=r_1(t)\cdot\sin(wt).$$

The signal $u_2(t)$ leaving signal generator 3 is multiplied in a multiplier 20 by a signal $r_2(t)$ leaving a transfer component 18, resulting in the product $$v_2(t)=r_2(t)\cdot u_2(t)=r_2(t)\cdot\sin(wt+\phi[w]).$$

In other words, the amplitudes are subjected to linear modulation, with w representing the angular frequency of the unbalance excitation or the frequency at which a substructure 24 is vibrating.

Signals $v_1(t)$ and $v_2(t)$ are added in an adder 21 and forwarded to a power amplifier 22. The amplifier 22 controls the rubber bearing 23, resulting in movement of the substructure 24. This motion is superimposed over the motion occasioned by the unbalance of the engine subassembly 1. The motion as a whole is detected by a signal generator 16. It will be assumed hereinafter that the power amplifier 22, rubber bearing 23, signal generator 16, and signal emitter 2 all operate linearly, and these interconnected components will be considered a subsystem.

Once this linear subsystem is in operation, the harmonic signal $$x(t)=r_1(t)\sin(wt)+r_2(t)\sin(wt+\phi[w])$$

entering power amplifier 22 will generate at the output terminal of signal generator 16 a harmonic signal $$g(t)=r_1(t)|G[jw]|\sin(wt+\arg G[jw])+r_2(t)|(G[jw]|\sin(wt+\phi[w]+\arg G[jw])$$

with a different amplitude $|G(jw)|$ and phase arg $G(jw)$. $G(jw)$ is the adjusting transfer function between power amplifier 22 and signal generator 16, and $r_1(t)$ and $r_2(t)$ are amplitudes to be appropriately established.

Furthermore, a harmonic motion of the engine subassembly 1 will generate a harmonic signal $$z(t)=Z(t)\sin(wt+q[w])$$

at signal generator 16.

The amplitude $Z(t)$ and the phase position $q(w)$ of this signal are affected by the unbalance forces of the engine subassembly 1 and by the dynamic behavior of the actively mounted engine.

It will be assumed hereinafter for simplicity's sake that all signals are periodic. The sensor signal s(t) characterizing the motion of substructure 24 can accordingly be represented in terms of the effect x(t) of the signal at the input terminal of power amplifier 22 as $$s(t) = r_1(t)|G(jw)|\sin(wt + \arg G[jw]) +$$
$$r_2(t)|G(jw)|\sin(wt + \phi[w] + \arg G[jw]) +$$
$$Z(t)\sin(wt + q[w]).$$

Amplitudes $r_1(t)$ and $r_2(t)$ will now be matched to rapidly minimize the motion of substructure 24 as characterized by sensor signal s(t). For this matching to occur in this method it will be necessary to determine the setting-transfer function of the subsystem ahead of time.

The empirical transfer function $Gm(jw)$ between power amplifier 22 and 16 is divided with respect to dimension $|Gm(jw)|$ and to phase arg $Gm(jw)$ to plot the curves $$a(w) = \frac{1}{|Gm(jw)|}\cos(\arg Gm[jw]) - \frac{\cos\phi(w)}{\sin\phi(w)}\arg Gm(jw)$$

$$b(w) = \frac{1}{|Gm(jw)|}\cdot\frac{\sin(\arg G[jw])}{\sin\phi(w)}$$

$$c(w) = \frac{1}{|Gm(jw)|}\cdot\cos(\phi[w] + \arg Gm[jw]) -$$
$$\frac{1}{|Gm(jw)|}\frac{\cos\phi(w)}{\sin\phi(w)}(\phi[w] + \arg Gm[jw])$$

$$d(w) = \frac{1}{|Gm(jw)|}\cdot\frac{\sin(\phi[w] + \arg G[jw])}{\sin\phi(w)}$$

The range of w is dictated by the frequency range of the subassembly vibrations to be isolated.

A signal characterizing the frequency of the subassembly vibrations is emitted from signal generator 3 and forwarded to characteristic curve generators 4, 6, 8, and 10.

The signals leaving characteristic curve generators 4, 6, 8, and 10 will be designated a(w), b(w), c(w), and d(w).

The signal $u_1(t)$ leaving signal generator 3 is multiplied by signal a(w) in a multiplier 5. The signal $u_2(t)$ leaving signal generator 3 is multiplied by signal b(w) in a multiplier 7. The resulting products are added in an adder 12. The sum is $$t_1(t) = (a[w] \cdot u_1[t]) + (b[w] \cdot u_2[t])$$
$$= (a[w] \cdot \sin[wt]) + (b[w] \cdot \sin[wt + \phi])$$
$$= \frac{1}{|Gm(jw)|} \sin(wt + \arg Gm[jw]).$$

The signal $u_1(t)$ leaving signal generator 3 is multiplied by signal c(w) in a multiplier 9. The signal $u_2(t)$ leaving signal generator 3 is multiplied by signal d(w) in a multiplier 11. The resulting products are added in an adder 13. The sum is $$t_2(t) = (c[w] \cdot u_1[t]) + (d[w] \cdot u_2[t])$$
$$= (c[w] \cdot \sin[wt]) + (d[w] \cdot \sin[wt + \phi])$$
$$= \frac{1}{|Gm(jw)|} \sin(wt + \phi[w] + \arg Gm[jw]).$$

The signal s(t) from signal generator 16 is now multiplied by the signal $t_1(t)$ from adder 12 in a multiplier 14 and by the signal $t_2(t)$ from adder 13 in a multiplier 15.

Since
$$\sin(x) \cdot \sin(y) = 1/2(\cos[x - y] - \cos[x + y])$$
and
$$G(jw) = Gm(jw),$$
$$s(t) \cdot t_1(t) = r_1(t) \cdot 1/2\{1 - \cos(2wt + 2 \arg G[jw])\} +$$
$$r_2(t) \cdot 1/2\{\cos \phi(w) - \cos(2wt + 2 \arg G[jw] + \phi[w])\} +$$
$$\frac{Z(t)}{|Gm(jw)|} \cdot 1/2\cos(q[w] -$$
$$\arg G[jw]) - \cos(2wt + q[w]] + \arg G[jw])$$
and
$$s(t) \cdot t_2(t) = r_1(t) \cdot 1/2\{\cos(-\phi[w]) - \cos(2wt + 2\arg G[jw])\} +$$
$$r_2(t) \cdot 1/2\{1 - \cos(2wt + 2\arg G[jw] + \phi[w])\} +$$
$$\frac{Z(t)}{|Gm(jw)|} \cdot \tfrac{1}{2}\cos(q[w] - \arg G[jw]) -$$
$$\cos(2wt + q[w]] + \arg G[jw]).$$

The product signal $s(t) \cdot T_1(t)$ is forwarded to the transfer component 17 and the product signal $s(t) \cdot t_2(t)$ to the transfer component 18.

The transfer components calculate amplitudes $r_1(t)$ and $r_2(t)$. It is important for the signals leaving the transfer components to contain only weak signal components with a frequency 2 w. These signal components can for this purpose be initially strongly attenuated in low pass filters. Known control algorithms can be applied to the signals leaving the filters. It is also possible to apply such an algorithm to $t_1$ and $t_2$ before forwarding them through the filters or to apply an algorithm that also serves to provide the filtering function. The last approach can in some situations be carried out by controls with only an integral component. The following description of the operation it will be assumed that the low pass filtering is carried out initially, followed by the application of a suitable algorithm.

The filter's cutoff frequency will ensure that any harmonic signals with a frequency of 2 w will be strongly attenuated, so that they can be ignored in what follows. The cutoff frequency, however, must not be low enough to prevent satisfactory dynamics in the system as a whole.

Since signals $r_1(t)$, $r_2(t)$, and Z(t) are relatively slow, they will hardly be affected by the low pass filtering.

The effect of the low pass filter will be represented by a prime (').

The signals leaving the low pass filter are $$e_1(t) = 1/2\{r_1[t]' + (r_2[t]' \cdot \cos \phi[w])\} +$$
$$\frac{Z(t)'}{|Gm(jw)|} \cdot \cos(q[w] - \arg G[jw])$$
and
$$e_2(t) = 1/2 \{r_1[t]' + \cos(-\phi[w] + r_2[t]') +$$
$$\frac{Z(t)'}{|Gm(jw)|} \cdot \cos(q[w] - \phi[w] - \arg G[jw]).$$

From these equations it will be evident that controls-input signals $e_1(t)$ and $e_2(t)$ are dependent on $r_1(t)'$ and $r_2(t)'$ respectively. We are accordingly dealing with coupled control circuits.

The coupling disengages when $\phi(w)=90°$, a constant. It is on the other hand most in evidence when cos $\phi(w)$ is large; that is, when $\phi(w)$ is small (in the vicinity of integral multiples of 180°). Precise studies have demonstrated that the coupling terms affect the dynamics of the system as a whole, even though its function is ensured.

The foregoing equations were derived under the assumption that the empirical frequency response $G_m(jw)$ is very close to the actual frequency response G(jw). This assumption can be justified by careful testing. It is also assumed that transient phenomena will be negligible. This assumption can be justified in many cases if the dimensions that occur vary continuously, meaning that there will be no sudden changes in practice.

Careful study of the foregoing equations will reveal that $e_1(t)$ is directly proportional to $r_1(t)$ and $r_2(t)$ at constant frequency. The relation of $e_1(t)$ to $r_1(t)$ and $r_2(t)$ depends only on the angle $\phi(w)$. There is no dependence on frequency response G(jw) in this context. The same is true for the relation of $e_2(t)$ to $r_1(t)$ and $r_2(t)$.

The dynamics of the system as a whole are substantially determined by the low pass filter, the control algorithm, and phase difference $\phi(w)$. The effect of frequency response G(jw) is negligible.

The relation between signals $e_1(t)$ and $e_2(t)$ and control outputs $r_1(t)$ and $r_2(t)$ respectively is dictated by the control order of algorithm. Proportional-integral controls on the $$r_1(t) = k_p \cdot e_1(t) + \frac{k_p}{T_I} \cdot \int_0^t e_1(t')dt' \text{ and}$$

$$r_2(t) = k_p \cdot e_2(t) + \frac{k_p}{T_I} \cdot \int_0^t e_1(t')dt'$$

wherein
$k_p$ is the amplification factor, and
$T_I$ the integration time constant of the control unit,
have been demonstrated effective.

The dynamics of the rubber bearing, the power amplifier, the first signal emitter, and the substructure can be affected by such ambient factors as temperature. Such factors can be taken into account by expanding the characteristic curves into characteristic surfaces, with the parameters affecting the dynamics representing additional inputs into the matrices. The additional inputs are determined with sensors, and the resulting input signals are plotted in the matrices. Such signals can be obtained from the rubber bearing and the substructure that it rests on in particular for the purpose of taking the effects of these components on the overall dynamics into account. The transfer components can act like low pass filters above a randomly determined cutoff frequency continuously obtained from the frequency of the motor vibrations that are to be suppressed. This approach represents an even greater improvement in dynamics.

When the engine's vibrations can be completely or incompletely described by a combination of two or more harmonic vibrations, the circuitry can be expanded to isolate all harmonic vibrations. Additional signal generators will be interpolated downstream of the signal emitter for this purpose, each generating two harmonic and mutually phase shifted first signals at a frequency that matches that of one component of the subassembly's vibrations plus a second signal characteristically reproducing each frequency generated.

Characteristic curve generators 4, 6, 8, and 10, multipliers 5, 7, 9, 11, 14, 15, 19, and 20, and adders 12 and 13 are positioned downstream of each respective signal generator 3, 16, 17 and 18.

Each multiplier 14 and 15 is electrically connected to the signal generator 16.

The signals leaving multipliers 19 and 20 will be forwarded to additional input terminals on adder 21.

In summary, accordingly, when several vibration components of different frequency are to be isolated simultaneously, the circuitry can be expanded to accommodate them, with signal generator 16, adder 21, and power amplifier 22 being utilized by all the subsidiary circuits. Characteristic curve generators 4, 6, 8, and 10 and transfer components 17 and 18 must match the frequency ranges which appear.

There has thus been shown and described a novel hydraulically cushioned rubber bearing that fulfills all the objects and advantages sought therefor. Many changes, modifications, variations, and other uses and applications of the subject invention will, however, become apparent to those skilled in the art after considering this specification and the accompanying drawings, which disclose the preferred embodiments thereof. All such changes, modifications, variations, and other uses and applications that do not depart from the spirit and scope of the invention are deemed to be covered by the invention, which is to be limited only by the claims that follow.

What is claimed is:

1. Control apparatus for a hydraulically damped rubber bearing adapted to support a vibrating mechanical subassembly on a substructure, said rubber bearing having a fluid-filled chamber and an actuator with an electromagnetic drive mechanism, associated with the fluid-filled chamber, for varying the hydraulic pressure in the chamber, said control apparatus comprising, in combination:
   (a) first signal emitter means coupled to the subassembly for sensing relative movement thereof and producing a signal representing such movement;
   (b) signal generator means coupled to the first signal emitter means for producing two harmonic-mutually phase shifted first signals having a common frequency equal to the frequency of vibration of the subassembly and producing a second signal that reproduces such common frequency in a characteristic manner;
   (c) a plurality of characteristic curve-generating means, each responsive to said second signal, for producing an output signal having a prescribed relationship to said second signal;
   (d) a plurality of first multiplier means, responsive to said first signals and said output signals, for producing third signals each representing the product of the respective values represented by one of said first signals and at least one of said output signals;
   (e) at least one first adding means, each coupled to receive two of said third signals, for producing a pair added signal representing the sum of the respective values represented by said pair of third signals;
   (f) second signal emitter means coupled to the substructure for sensing relative movement thereof and producing a fourth signal representing such movement;
   (g) a plurality of second multiplier means, responsive to said pair added signals and to said fourth signal, for producing fifth signals each representing the product of the respective values represented by one of said third signals and said fourth signal;
   (h) a plurality of transfer component means, each responsive to one of said fifth signals, for producing a sixth signal in dependence thereon, said transfer component means each having a transfer function which exhibits a low pass filter behavior above a prescribed frequency;
   (i) a plurality of third multiplier means, each responsive to one of said sixth signals and to one of said first signals, for producing a seventh signal representing the product of the respective values represented by one of said sixth signals and one of said first signals;
   (j) second adding means, responsive to said seventh signals, for producing an eighth signal representing the sum of the respective values represented by said seventh signals; and
   (k) power amplifier means, responsive to said eighth signal, for producing a power output signal for controlling said drive mechanism of said rubber bearing.

2. The rubber bearing control apparatus defined in claim 1, wherein an analog-to-digital converter is positioned downstream of at least one of the emitter means and a digital-to-analog converter is positioned upstream of the power amplifier means.

3. The rubber bearing control apparatus defined in claim 1, wherein the two harmonic signals generated by the signal generator are phase-shifted at an angle that depends on the frequency that the subassembly is vibrating at.

4. The rubber bearing control apparatus defined in claim 1, further comprising at least one additional signal generator means coupled to the first signal emitter means, each additional signal generator means producing two mutually phase shifted additional first signals at the same frequency as one component of the subassembly vibrations and an additional second signal that reproduces such frequency in a characteristic manner; additional characteristic curve generating means, each responsive to said additional second signals for producing an additional output signal having a prescribed relationship to said second signal; wherein the output signals from the additional characteristic curve generating means are multiplied in said first multiplier means by the additional first signals from the additional signal generator and the accordingly obtained additional third signals are added pairwise in said first adder means; wherein the accordingly obtained additional pair added signals are each multiplied in said second multiplier means by the fourth signal from the second signal emitter; wherein the accordingly obtained additional fifth signals are supplied to additional transfer component means; wherein the accordingly obtained additional sixth signals are each multiplied in additional third multiplier means by the additional first signals; and wherein the accordingly obtained additional seventh signals are added together with said seventh signals in said second adding means to produce said eighth signal.

* * * * *